United States Patent [19]
Dao

[11] Patent Number: 5,255,528
[45] Date of Patent: Oct. 26, 1993

[54] METHOD AND APPARATUS FOR RECUPERATING WASTE HEAT IN ABSORPTION SYSTEMS

[76] Inventor: Kim Dao, 12 Nace Ave., Piedmont, Calif. 94611

[21] Appl. No.: 894,053

[22] Filed: Jun. 3, 1992

[51] Int. Cl.$^5$ .......................................... F25B 15/00
[52] U.S. Cl. .................................. 62/101; 62/476
[58] Field of Search ............ 62/476, 101, 104, 105, 62/483, 484, 485

[56] References Cited

U.S. PATENT DOCUMENTS

| | | | |
|---|---|---|---|
| 2,410,457 | 11/1946 | Nettel | 62/485 |
| 4,410,134 | 10/1983 | Heimbach et al. | 62/483 |
| 4,846,240 | 7/1989 | Erickson | 159/24.2 |
| 5,024,063 | 6/1991 | Erickson | 62/101 |
| 5,097,676 | 3/1992 | Erickson | 62/476 |

Primary Examiner—Albert J. Makay
Assistant Examiner—William C. Doerrler
Attorney, Agent, or Firm—Phillips, Moore, Lempio & Finley

[57] ABSTRACT

The invention relates to an absorption system having a regenerator (17) wherein an absorption process of the absorption of low-pressure ammonia vapor into a weak liquid solution of ammonia-water is carried out in the shell (16) of the regenerator (17) with the heat of absorption being used in a generation process wherein a high-pressure ammonia water solution is boiled in a conduit (14) passing through the regenerator (17). A waste heat recovery conduit (40, 40', 40") is provided for concurrent flow of an ammonia-water solution and ammonia-water vapor, the flow being heated (46) to boil the solution. The heated vapor is then introduced into the absorption process in the shell (16) of the regenerator (17) with the heat (46) used to boil the solution in the waste heat recovery conduit (40) being recuperated in the regenerator as the hot vapor is absorbed into the ammonia-water solution therein. The heat (46) used to heat the waste heat recover conduit (40) can be waste heat in the flue gas (56), or waste heat in the cool end (61) of the regenerator (17), or waste heat in the high-temperature high-pressure vapor generated in the heating conduit (14) in the regenerator and/or in the externally-heated generator (18).

24 Claims, 3 Drawing Sheets

METHOD AND APPARATUS FOR RECUPERATING WASTE HEAT IN ABSORPTION SYSTEMS

This invention relates to a method and apparatus for recuperating heat that is otherwise wasted because of practical considerations in the design of absorption systems. The method eliminates significant design constraints without excessive deterioration of the coefficient of performance (COP), and means as provided for recuperating heat that may be otherwise economically irrecuperable. The invention is applicable to absorption systems such as absorption heat pumps and regenerative absorption cycles, and in particular, to absorption systems using fluid mixtures with volatile absorbent, such as ammonia and water.

BACKGROUND OF THE INVENTION

In efficient absorption systems, most internal heat can be theoretically regenerated (or recuperated) using a generator-absorber type of heat exchange (GAX). However GAX systems present three major practical and economical problems that prevent full realization of the theoretically possible heat regeneration: (1) heat exchanger finite temperature approaches $\Delta T$'s; (2) mixing losses in the absorption process; and, (3) rectification loses in the generation process.

Heat exchanger $\Delta T$'s cause large performance loss. It is difficult to reduce this loss because of the negative exponential relationship between $\Delta T$ and 1/UA (the reciprocal of the heat transfer coefficient U times the heat exchange surface area A). An increase in UA yields a rapidly diminishing return in performance, therefore the costly increase in area A must be supplemented by a more economical increase in U in order to get an acceptable performance at a reasonable cost. This invention provides a means that allows a better heat transfer coefficient U.

Mixing losses occur when feeding cold vapor into the absorption process. The losses are in the form of temperature drops resulting from mixing two streams that are not in temperature and/or in concentration equilibrium. The temperature drops reduce available heat exchanger $\Delta T$ and, most importantly, shift the absorption heat to a lower temperature range where it is unavailable for recuperation. Mixing losses in absorption processes can be minimized by using counterflow vapor-liquid contact. This counterflow arrangement is difficult to realize in practical and economical systems because of its low heat transfer coefficients and its dependence on gravity, resulting in a bulky size. The present invention reduces the need for gravity.

Rectification losses occur when the vapor leaving the generation process is too hot and contains too much absorbent species. The vapor heat is eventually dumped to the atmosphere and the residual absorbent absorbs and retains much of the available high pressure vapor for a turbine, or much of the available refrigerant in an evaporator. Rectification losses in generation processes can be minimized by using counterflow vapor-liquid contact. Again this counterflow arrangement is difficult to realize in practical and economical systems because of its low heat transfer coefficients and its bulky size.

The difficulties are compounded in a GAX heat exchanger because both the absorption and the generation processes require counterflow vapor-liquid contact. Since only gravity can be used economically to effect such counterflow arrangement and since the processes in a GAX cycle should be themselves counterflow (if they are to be in direct heat transfer coupling), only one of them can be satisfied. Both processes can be made counterflow, with additional costs for an intermediate heat transfer loop that separates and put the flows in their appropriate directions. This approach is very expensive (because it doubles the size of the heat exchanger and requires more pumps) and inefficient because of additional heat exchanger $\Delta T$'s that negate the benefits of counterflow.

Vapor-liquid concurrent absorption and generation processes are desirable because of their independence of gravity which allows more flexibility in system packaging to satisfy market preference and because of possible increases in fluid velocities that improve heat transfer coefficients, therefore reducing surface area and cost.

SUMMARY OF THE INVENTION

It is the principal object of the present invention to provide a method and apparatus for reducing mixing and rectification losses when using concurrent absorption and concurrent generation processes such as in a GAX type of recuperation. The invention also provides means for recuperating other heat that would otherwise be wasted. The invention is particularly effective for fluid mixtures with a volatile absorbent, such as $NH_3$—$H_2O$, that have large mixing and rectification losses.

The method comprises injecting a liquid and a vapor into a conduit to form a concurrent fluid stream that is heated in the conduit, with the vapor (and excess liquid if any) being channeled to the absorption process and of heating said conduit with a heat source. Preferably the heat source is waste heat such as absorber heat, hot vapor heat, flue gases, or a combination thereof. The boiling of injected liquid, and, to a lesser extent the heating of vapor in said conduit, essentially transport the waste heat to the absorption process under the form of absorbent concentration, latent and sensible heat. The absorption process is then cooled by its GAX coupled generation process with the waste heat being recovered and used in the generation process. Such a GAX generation process generally requires more heat than its coupled absorption process can provide.

Advantages and novel features of the invention will be set forth in the description which follows and in part will become apparent to those skilled in the art upon examination of the following, or may be learned by practice of the invention. The objects and advantages of the invention may be realized by the instrumentalities and combinations pointed out in the appended claims.

BRIEF DESCRIPTION OF THE DRAWINGS

The accompanying drawings, which are incorporated in and form part of the application, together with the description, serve to explain the principles of the invention.

DESCRIPTION OF THE PREFERRED EMBODIMENTS

Figure 1:
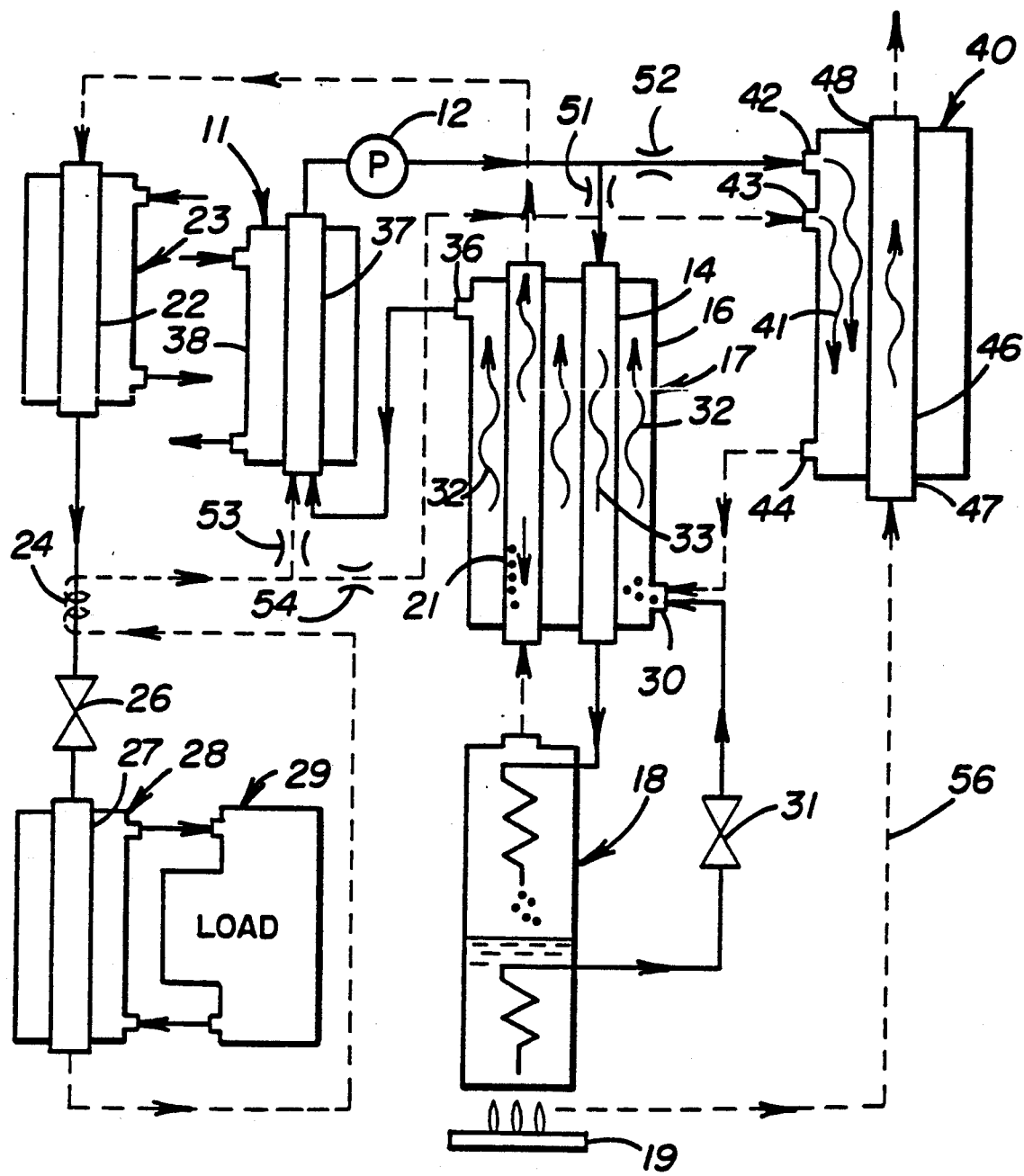
FIG. 1 is a generally schematic illustration of one embodiment of the invention, wherein external heat is recuperated in an absorption system, with liquid flow lines being indicated by solid lines and with vapor lines and the flue gas conduit being indicated by dashed lines.

Referring now to the drawings, wherein preferred embodiments are shown, FIG. 1 discloses a basic absorption cycle using a generator-absorber type of heat exchange (GAX). Although other fluid pairs maybe used, for purposes of illustration the system disclosed herein is described with ammonia as the condensable vaporous working fluid that is absorbed into and boiled out of water as the circulating absorbent solution.

A low-temperature liquid solution of ammonia and water from absorber 11 is pumped up to a high pressure by pump 12 and injected into heating conduit 14 inside the shell 16 of regenerator 17. After being heated in conduit 14, the solution passes into the interior of externally-heated generator 18, heated by burner 19. Hot ammonia vapor and some water vapor from generator 18 passes through vertical rectification conduit 21 inside regenerator 17. The vapors are cooled in conduit 21 and the condensed water vapor drains by gravity back into the generator 18. The high pressure ammonia vapor from the rectification conduit then passes to conduit 22 in the externally cooled condenser 23. The ammonia is condensed into liquid, cooled by precooler 24, and reduced in pressure by expansion valve 26. The low-pressure liquid ammonia is boiled at a low temperature in conduit 27 of evaporator 28 by the liquid coolant circulating between evaporator 28 and cooling load 29. The condenser 23, expansion 26 and evaporator 28 constitute an energy extracting means whereby the high-pressure working fluid vapor is reduced in pressure to extract energy therefrom.

In a conventional GAX cycle, the low-pressure and low-temperature ammonia vapor from evaporator 28 and precooler 24 is delivered directly to the shell inlet 30 of regenerator 17, together with a hot, weak $NH_3$-water solution from generator 18 that has been reduced to low pressure by expansion valve 31. The ammonia vapor is absorbed back into the liquid solution, with this absorption process being indicated by the flow arrow 32. The heat of absorption from the absorption process is used in the generation process, indicated by flow arrow 33, of vapor from the ammonia-water solution flowing through conduit 14.

The low-pressure liquid solution then exits from the shell outlet 36 at the cool end of the regenerator 17 and goes to the internal conduit 37 of the externally cooled absorber 11. Additional low-pressure ammonia vapor from evaporator 28 is absorbed into the liquid solution in absorber 11 to produce a solution from the absorber that is rich in ammonia. This competes the GAX cycle, with heat from the cycle being rejected to the coolant circulating through the shell 38 of the absorber 11.

In accordance with the present invention, a waste heat recovery conduit 40 is provided, conduit 40 having an interior 41, liquid and vapor inlets 42 and 43 at one end of conduit 40 and an outlet 44 at the other end. Liquid and vapor entering the inlets will flow concurrently through the interior 41 of conduit 40 and be heated by the heat source represented in FIG. 1 as an internal conduit 46 having a hot end 47 and a cold end 48. It is desirable to choose the locations of the inlets 42 and 43 of conduit 40 to match the temperature of the entering fluids with the temperature distribution of the heat source along the length of conduit 46.

The liquid entering conduit 40 can be taken from a convenient location in the GAX cycle, such as from the delivery side of circulation pump 12, flow restrictors 51 and 52 being used to divide the flow from pump 12 to the heating conduit 14 in the regenerator and to conduit 40. The ammonia vapor entering conduit 40 is preferably taken from the low-pressure ammonia vapor from evaporator 28 after it passes through the precooler 24. Flow restrictors 53 and 54 are used to divide the vapor flow from evaporator 28 to absorber 11 and to conduit 40. The heat source conduit 46 can be part of the flue 56 for recovery of heat from the hot flue gas from burner 19.

As the liquid from pump 12 flows through conduit 40 and is heated it will boil, creating ammonia and water vapors, which combine with the ammonia vapor entering inlet 43. Preferably the amount of liquid injected into conduit 40 is designed so that most of it is boiled off before reaching outlet 44. The heated vapors are now delivered from outlet 44 to inlet 30 of regenerator 17 for absorption into the weak ammonia-water solution coming from generator 18. Mixing losses are reduced because the heated vapors from conduit 40 are in closer equilibrium with the solution from generator 18. The otherwise wasted heat from the flue gas that is used to heat and boil the liquid in conduit 40 is now recovered in the regenerator 17 as such vapor is reabsorbed into the liquid solution in the regenerator, with the heat produced by the absorption process 32 being used in the generation process 33. Because of this heat exchange the absorption process 32 is cooled by the generation process 33.

Figure 2:
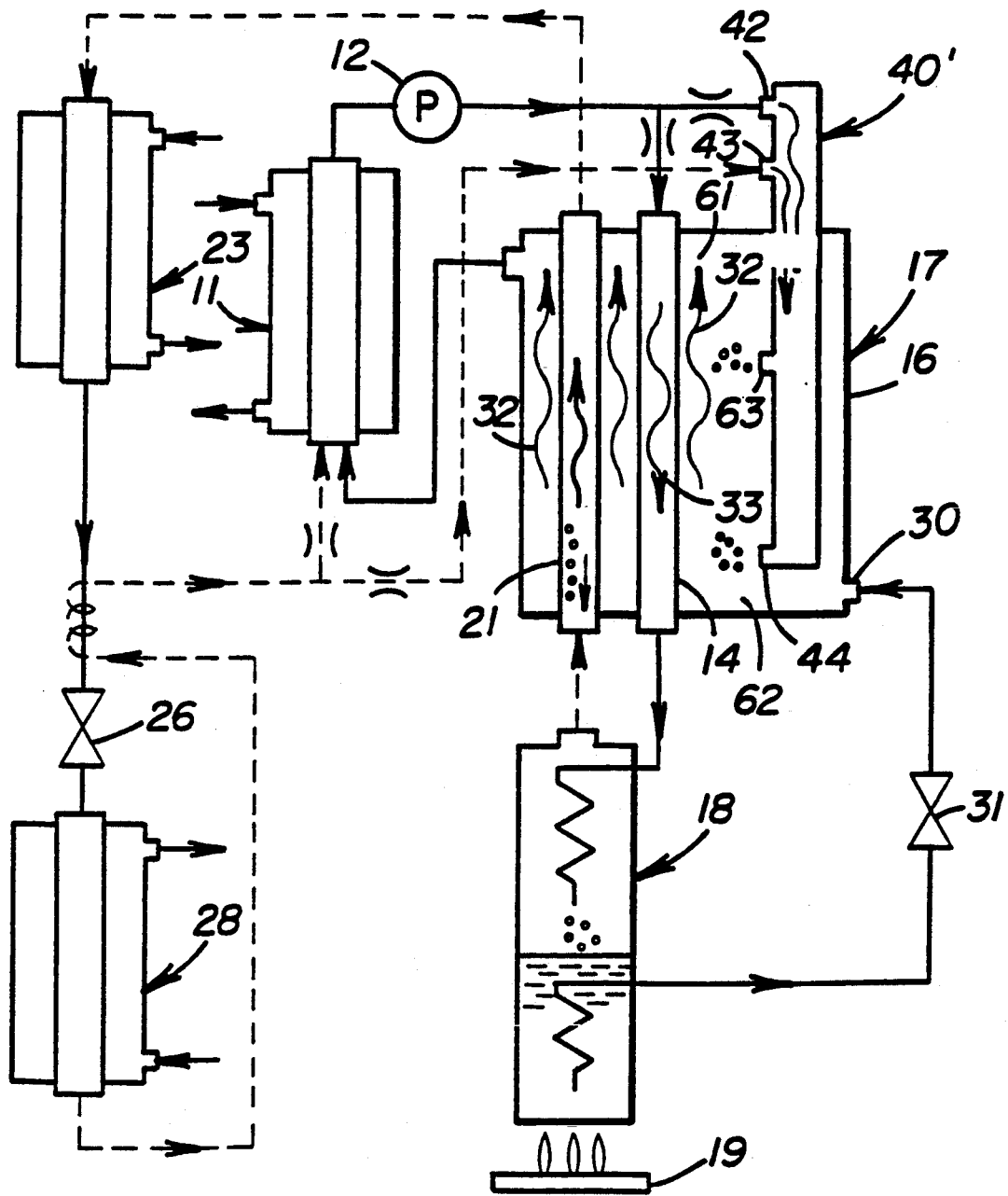
FIG. 2 is a similar illustration of another embodiment of the invention, with recuperation of absorption heat in the low temperature end of a regenerator.

FIG. 2 illustrates an embodiment applicable to the recuperation of absorption heat in regenerator 17. Waste heat recovery conduit 40' is shown extending into regenerator shell 16 where it can pick up heat from the absorption process 32 occurring in the low temperature zone 61 of the regenerator. This zone of regenerator 17 now plays the role of the heating conduit 46 in FIG. 1. Since the absorption process 32 produces more heat in the low-temperature zone 61 than conduit 14 can take, the excess heat of absorption can now be recuperated by conduit 40' to improve COP. Conduit 14 has a low heat capacitance in zone 61 because it is still mostly sensible heating of the liquid in conduit 14. Conduit 14 will have boiling heat capacitance when it reaches the high temperature zone 62 of regenerator 17. Conduit 40' should not take much heat from the high temperature zone 62 because absorption heat is in short supply there and is better used to heat conduit 14. To ensure this, the amount of liquid injected at inlet 42 should be designed such that most of the injected liquid is boiled off before it reaches zone 62. The middle (in terms of heat transfer area) of the regenerator can be considered the boundary between zone 61 and zone 62. Heat recuperation by conduit 40' is possible because the boiling in zone 61 produces a vapor richer in absorbent species that can be transported to zone 62 where it is reabsorbed. A higher absorbent concentration in zone 62 allows more vapor to be absorbed there. Mixing losses are also reduced because the heated vapor is in closer equilibrium with the solution into which it come in contact. Other improvements can be added such as fitting conduit 40' with orifices (such as orifice 63) that release vapor into the absorption process along the entire length of regenerator 17, not just at outlet 44. This progressive release of vapor reduces further temperature drops because a lesser amount of unmatched vapor is mixed with the absorbent, and also reduces pressure drops.

The amount of waste heat (generally at low temperature) that can be recuperated is determined by the amount of vapor needed for the absorption process in regenerator 17. This limited recuperation potential has been used, in FIG. 2, for low temperature absorption heat in zone 61, therefore the recuperation of hot vapor heat has to be done with other flow streams. The hot vapor produced by the generator 18 can be recuperated and rectified by passing it through conduit 21 in regenerator 17 that allows counterflow vapor rectification by gravity. With the arrangement of FIG. 2, improvement has been made concerning the absorption process of regenerator 17 that now no longer needs gravity. However, there remains the problem of the tall vertical dimension of the regenerator required for hot vapor rectification by gravity. The height of the regenerator makes it difficult to package the system in a low profile cube shape similar to that of the electric heat pump.

Figure 3:
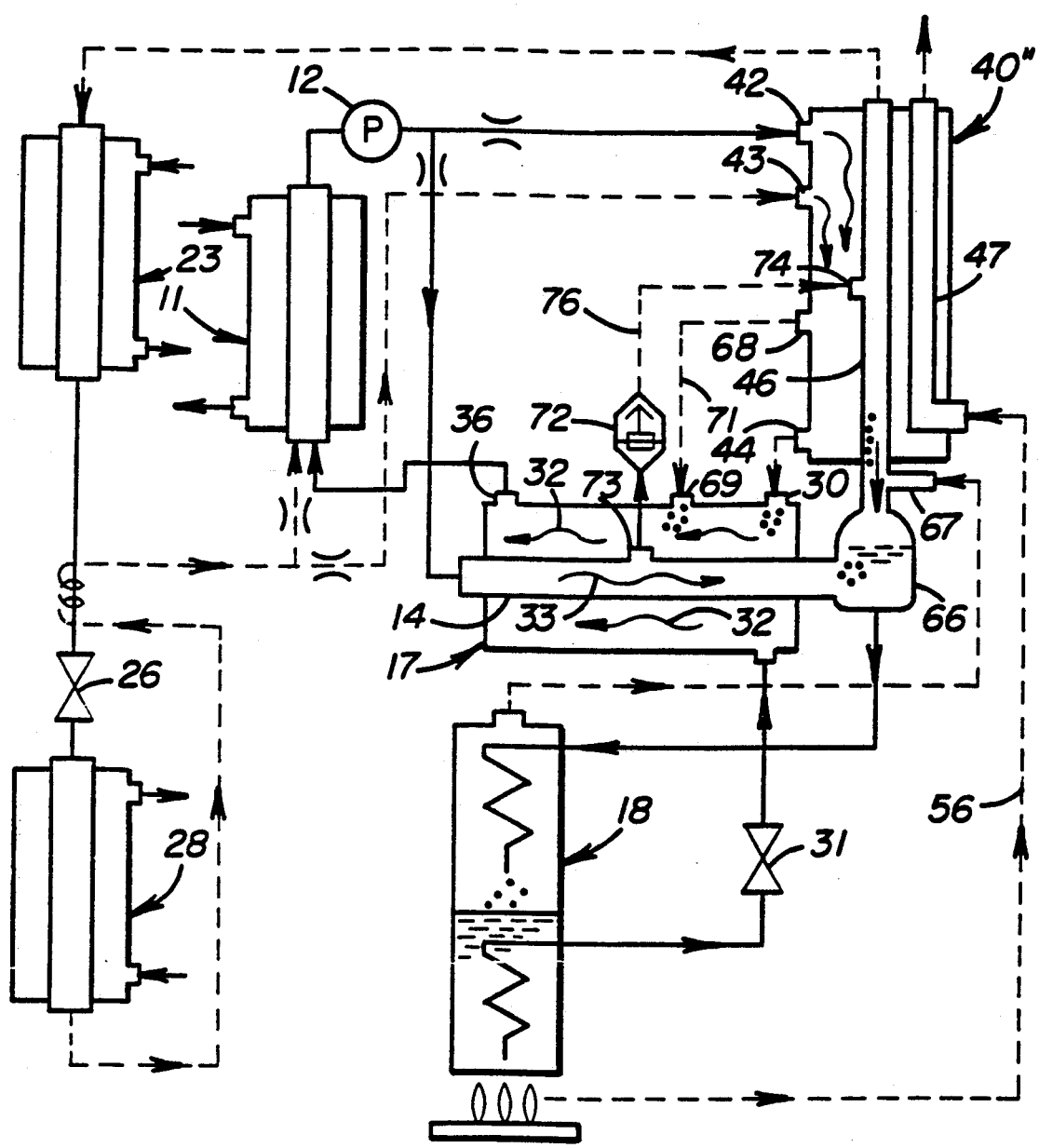
FIG. 3 is a similar illustration of a further embodiment of the invention, with recuperation of heat from hot vapor produced by a generation process.

FIG. 3 shows an embodiment that can solve the height problem with acceptable COP loss as compared to that shown in FIG. 2. The regenerator 17 can be horizontally disposed, with heating conduit 14 discharging into separator 66. The hot vapor produced by boiling in conduit 14 now passes upwardly through conduit 46 to provide heat for the concurrent fluids entering waste heat recovery conduit 40" through inlets 42 and 43. The vertical conduit 46 is cooled and condensed water will drain by gravity back into separator 66. Injected liquid at inlet 42 is restricted such that minimum liquid is present at outlet 44. The amount of vapor entering inlet 43 is controlled such that a minimum of vapor is left at outlet 36 of regenerator 17. In this embodiment, vapor heat in conduit 46 is essentially returned to the absorption process in the regenerator for use in the generation process in conduit 14. Since the heats in both streams flowing through conduits 40" and 46 are latent heats and the heat capacitance of both streams are about equal, temperature matching is quite good, resulting in low losses. Since both the absorption process 32 and generation process 33 no longer need gravity, the regenerator can be designed with less constraints. Fluid velocity, channel geometry, and the overall shape can be optimized for low cost. System packaging can also be designed according to market preference. Gravity is still needed to rectify the hot vapor in conduit 46 but the amount of heat involved is much smaller than that of regenerator 17 and its vertical dimension is no longer objectionable. Extra heat can be recuperated from external sources, such as flue gas heat from burner 19 passing through conduit 4 inside of conduit 40".

FIG. 3 shows further improvements on the embodiment of FIG. 2 thus far described. First, inlet 67 can be added to conduit 46 to receive other hot vapors, such as the vapor coming from the generator 18. Other conduits similar to conduit 46 can be installed in conduit 40" to rectify and/or cool other heat sources, such as vapors at different pressures. Secondly, outlet 68 can be used to tap off vapor from the interior of conduit 40" to inlet 69 of regenerator 10 by line 71. Such vapor tapping reduces pressure drops in the absorption process in the regenerator, and reduces flow rate in the portion of conduit 40" extending from outlet 68 to outlet 44, such that the vapor exiting outlet 44 can be hotter. Thirdly means such as a float valve 72 can be installed at outlet 73 of conduit 14 to extract the boiled off vapor of the generator process in conduit 14 and feed it to inlet 74 of conduit 46 by line 76. Such vapor extraction reduces pressure drops in conduit 14 and the heat duty of conduit 46 because less vapor enters the hot end of conduit 46. Locations of vapor tapping and extracting should be chosen to minimize the heat duty of conduit 46.

Other variations of embodiments are possible, depending on availability of waste heat sources and cost/performance trade-offs. Series/parallel combinations of the generic conduits 40 and 46 can be applicable to different design objectives, such as boiling only the injected liquid with a heat source, in a first conduit 40 then feeding the resulting fluid to a fluid coming from a second parallel conduit 40 heated by another heat source, to form a third serial conduit 40 heated by yet another heat source or dividing the embodiment in parallel components, each recuperating a different heat source.

Although the embodiments of the invention are described in connection with a single effect GAX cycle, it is to be appreciated that the invention can be used with more advanced cycles, such as the combination of single-effect regenerative absorption cycle and absorber-coupled double-effort regenerative cycle shown in my U.S. Pat. No. 4,921,515, issued May 1, 1990, or the regenerative absorption cycle with multiple state absorber shown in my U.S. patent application Ser. No. 715,565, filed Jun. 14, 1992, or the regenerative absorption cycle with super pressure boiler shown in my U.S. application Ser. No. 886,445, filed Apr. 10, 1992.

The foregoing description of preferred embodiments have been presented for the purpose of illustration and description. It is not intended to be exhaustive or to limit the invention to the precise features described. It is intended that the scope of the invention be defined by the claims appended hereto.

I claim:

1. A method of recovering waste heat in an absorption system having working and absorbent fluids, comprising the steps of:
   (a) forming a concurrent fluid stream of liquid and vapor, which are fluids of said absorption system,
   (b) heating said concurrent fluid stream with waste heat,
   (c) delivering said heated fluid stream to an absorption process,
   (d) cooling said absorption process to recover waste heat used in step (b).

2. The method of claim 1, wherein said absorption system includes a generation process in heat transfer relationship with said absorption process, and wherein said absorption process is cooled by said generation process.

3. The method of claim 2, wherein said liquid in said concurrent fluid stream is a solution of ammonia and water and wherein said vapor is ammonia-water vapor.

4. Apparatus for recovering waste heat in an absorption system having a regenerator in which an absorption process takes place, said apparatus comprising:
   a waste heat recovery conduit having spaced apart inlet and outlet ends,
   means for introducing vapor and liquid into the inlet end of said conduit for concurrent flow therethrough to the outlet end thereof,
   means for heating said conduit, means for delivering fluid from the outlet end of said conduit to the absorption process in said regenerator.

5. Apparatus as set forth in claim 4, wherein said absorption system includes a burner, and wherein said means for heating said waste heat recovery conduit is at least partially flue gas from said burner.

6. Apparatus as set forth in claim 4, wherein the absorption process in said regenerator has a low-temperature end, and wherein said waste heat recovery conduit is disposed at least partially in said regenerator in said low-temperature end of said absorption process.

7. Apparatus as set forth in claim 4, wherein said absorption system includes means for boiling a liquid, and wherein said means for heating said waste heat recovery conduit is at least partially hot vapor resulting from said boiling.

8. Apparatus as set forth in claim 4, wherein said absorption process is the absorption of a condensable vaporous working fluid into an absorbent liquid, and wherein said vapor introduced into the inlet end of said waste heat recovery conduit is vapor of said working fluid.

9. Apparatus as set forth in claim 4, wherein said absorption process is the absorption of a condensable vaporous working fluid into a absorbent liquid, and wherein said liquid introduced into the inlet end of said waste heat recovery conduit is absorbent liquid of said absorbent system.

10. Apparatus as set forth in claim 4, wherein said absorption process is the absorption of ammonia vapor into water, wherein said vapor and liquid introduced into the inlet end of said waste heat recover conduit are ammonia-water vapor and an ammonia-water solution, respectively.

11. Apparatus as set forth in claim 4, and further including a heating conduit in said regenerator in heat transfer relationship with said absorption process, and means for injecting low-temperature liquid into said heating conduit.

12. Apparatus as set forth in claim 11, wherein said absorption process is the absorption of a condensable vaporous working fluid into an absorbent liquid, wherein said vapor and said liquid introduced into the inlet end of said waste heat recover conduit are vapor of said working fluid and absorbent liquid respectively, and wherein said low-temperature liquid injected into said heating conduit is a solution of said working fluid and said absorbent liquid.

13. Apparatus as set forth in claim 12, wherein said working fluid is ammonia and said absorbent liquid is water.

14. Apparatus as set forth in claim 12, wherein said absorption system includes a burner, and wherein said means for heating said waste heat recovery conduit is at least partially flue gas from said burner.

15. Apparatus as set forth in claim 12, wherein the absorption process in said regenerator has a low-temperature end, and wherein said waste heat recovery conduit is disposed at least partially in said regenerator in said low-temperature end of said absorption process.

16. Apparatus as set forth in claim 12, wherein said means for heating said waste heat recovery conduit is at least partially hot vapor generated in said heating conduit.

17. The method of claim 2, and further including: delivering absorbent liquid to said absorption process for concurrent flow through said absorption process with said heated fluid stream.

18. The method of claim 17, and further including:
tapping off an intermediate portion of said concurrent fluid stream being heated by said waste heat,
delivering said tapped-off portion to said absorption process at an intermediate point along the length thereof.

19. A method of recovering waste heat in an absorption system having a high-pressure generator for heating a solution of working and absorbent fluids to produce high-pressure working fluid vapor, energy extracting means for reducing the pressure of said high-pressure working fluid vapor to extract energy therefrom, a regenerator, means for delivering low-pressure liquid solution from said generator to said regenerator, means for delivering low-pressure working fluid vapor from said energy extracting means to said regenerator for absorption into said low-pressure liquid solution, and means for using heat from the absorption of said low-pressure working fluid vapor into said low-pressure liquid solution to heat a solution of working and absorbent fluids going to said high-pressure generator, said method comprising:
 a) heating low-pressure absorbent liquid with waste heat to produce absorbent vapor,
 b) delivering said absorbent vapor to said regenerator for absorption into the low-pressure liquid solution delivered to said regenerator from said generator.

20. The method of claim 19, wherein said low-pressure absorbent liquid heated by said waste heat has working fluid initially absorbed therein so that said heating with waste heat also produces working fluid vapor, and wherein such working fluid vapor is delivered to said regenerator for absorption into the low-pressure liquid solution delivered to said regenerator from said generator.

21. The method as set forth in claim 20, and further including flowing said low-pressure working fluid vapor from said energy extracting means concurrent with said low-pressure absorbent liquid as said low-pressure absorbent liquid is heated by said waste heat prior to the delivery of said low-pressure working fluid to said regenerator.

22. The method as set forth in claim 20, wherein said low-pressure working fluid vapor and said low-pressure liquid solution delivered to said regenerator are flowed concurrently through said regenerator during absorption of said working fluid vapor into said absorbent liquid.

23. In a system for recovering waste heat in an absorption system having a high-pressure generator for heating a solution of working and absorbent fluids to produce high-pressure working fluid vapor, energy extracting means for reducing the pressure of said high-pressure working fluid vapor to extract energy therefrom, a regenerator, means for delivering low-pressure liquid solution from said generator to said regenerator, means for delivering low-pressure working fluid vapor from said energy extracting means to said regenerator for absorption into said low-pressure liquid solution, and means for using heat from the absorption of said low-pressure working fluid vapor into said low-pressure liquid solution to heat a solution of working and absorbent fluids going to said high-pressure generator, the improvement comprising:

a waste heat recovery conduit having spaced apart inlet and outlet ends, means for introducing low-pressure absorbent liquid into the inlet end of said conduit flow therethrough to the outlet end thereof, means for heating said conduit with waste heat to produce absorbent vapor, means for delivering fluid from the outlet end of said heat recovery conduit to said regenerator for absorption into the low-pressure solution delivered to said regenerator from said generator.

24. A system as set forth in claim 23, wherein said means for delivering low pressure working fluid vapor from said energy extracting means to said regenerator for absorption into said low-pressure liquid solution includes means for delivering said low-pressure working fluid vapor from said energy extracting means to said waste heat recovery conduit for concurrent flow therethrough with said low-pressure absorbent liquid.

* * * * *